Jan. 25, 1955

V. A. ORLANDO 2,700,739

ELECTROMAGNETIC APPARATUS

Filed Aug. 6, 1953

Inventor:
Vincent A. Orlando,
by Richard E. Hosley
His Attorney.

Jan. 25, 1955 V. A. ORLANDO 2,700,739
ELECTROMAGNETIC APPARATUS
Filed Aug. 6, 1953 2 Sheets-Sheet 2

Inventor:
Vincent A. Orlando,
by Richard E. Hosley
His Attorney.

United States Patent Office 2,700,739
Patented Jan. 25, 1955

2,700,739

ELECTROMAGNETIC APPARATUS

Vincent A. Orlando, Beverly, Mass., assignor to General Electric Company, a corporation of New York Application August 6, 1953, Serial No. 372,708

9 Claims. (Cl. 310—166)

The present invention relates to electromagnetic control apparatus and, more particularly, to electrical control signal generators and sensitive torque motors.

Among the numerous conventional arrangements for generating electrical signals responsive to angular displacements between rotor and stator elements, one of the most useful for certain applications is the type which has a rotor of permeable magnetic material, having no excited windings thereon, and which has a stator including exciting and output windings so disposed that magnetic flux traversing the output windings is controlled by the rotor orientations in relation to the stator. In principle, such apparatus is essentially of a variable-reluctance design, wherein the magnetic reluctances of magnetic circuits surrounded by the output windings are changed by physically moving the magnetic material of the rotor such that it shunts varying amounts of magnetic flux from the exciting windings to the magnetic circuits of the output windings. Representative of such devices is the variable-reluctance transformer apparatus having a three-legged open-ended stator core with an exciting winding on the center core leg and output windings on the outer core legs, the armature comprising a member of magnetic material dimensioned such that it is shorter than the span between the outer open-ended core legs and disposed such that it may shorten the air gap between the center core leg and one outer core leg while lengthening the gap between the center leg and the other outer core leg. Other arrangements of a similar type include a symmetrical four-poled stator core with exciting windings on one set of oppositely disposed poles and with output or pick-off windings on the other set of oppositely disposed poles, the rotor comprising a shaped member of magnetic material which may be angularly oriented to vary the reluctances of the magnetic flux paths including the poles on which the output windings are mounted.

While the aforementioned versions of control signal generators are advantageous in that the movable armatures thereof require no connection with electrical energy sources, highly undesirable torques and magnetic side-pulls are experienced between the relatively movable elements, due to the presence of the magnetic material of the armature and, further, the relative orientations of the relatively movable elements are particularly critical inasmuch as minute misalignments affect magnetic reluctances, disturb the output signal accuracies, and cause large magnetic side-pulls and torques. These disadvantages are most serious when a signal generator is to be employed with apparatus which demands the highest and most consistent accuracies of signal outputs or which is adversely sensitive to torques present in the signal generator. Gyroscopic apparatus, for example, is detrimentally affected by the disadvantages of both such natures, since a control signal generator measuring displacements about a gyroscope axis must be accurately sensitive to angular displacements alone and must introduce no appreciable torques which would effect erroneous precession.

In accordance with the instant invention, these disadvantages of prior control signal apparatus are minimized to the point of being negligible, while securing additional advantages of both mechanical and electrical qualities. The improvements are realized through the use of a shorted conducting armature, having no movable magnetic material, which functions to intercept an excitation magnetic flux and induce characteristic electrical signals in output circuits responsive to movements of the conducting armature. This is accomplished by signal generator assemblies which are uniquely insensitive to armature movements in directions other than those sought to be measured, and which may also be operated as torque motors without physical modification. Heretofore, conductive shorted turns have appeared in motor, motion-repeating, and signal-generating apparatus, but for the purposes of effectuating compensations, flux reorientations, and variations in magnetic circuit balances. By way of one contrast, the shorted armature apparatus here disclosed is essentially an inductive apparatus. Further, the effects realized by the invention are the result of compounded variations: first, movement of the armature in relation to a fixed stator flux pattern occasions variations in the magnitude of currents induced in the armature by the stator flux, with an attending variation in the magnitude of armature flux generated by the circulating armature currents; and, second, armature movement varies the orientation of this armature flux in relation to fixed output windings (in a signal generator embodiment) or fixed torque motor windings (in a torque motor embodiment), with attending variations in output voltages or torques.

It is one of the objects of this invention to provide unique and improved control signal generating apparatus having a shorted conducting armature.

Second, it is an object to provide a novel and improved electromagnetic device having a shorted conducting armature reacting with magnetic flux from a stator to yield improved torque vs. deflection characteristics between the armature and stator independently of certain undesired structural misalignments.

Further, it is an object to provide an electrical pick-off which has minimized torques and side thrust between relatively rotatable members, insensitivity to radial and axial misalignments between relatively rotatable members, and an improved null and signal-to-noise ratio characteristics of electrical output signals.

A still further object is to provide an improved electromagnetic device having an entirely non-magnetic rotor and adaptable for connection as either a signal generator or torque motor without modification of structural design.

By way of a summary account of one aspect of this invention, I provide a closed four-poled symmetrical stator core having a pair of exciting windings serially connected and energized with periodically varying electrical signals, one winding on each of a pair of oppositely disposed poles, and a pair of serially connected output windings, one on each of the remaining pair of oppositely disposed poles. A single flat shorted turn of conducting non-magnetic material serves as the sole rotor element and may be neutrally positioned in radial alignment with either the exciting or output winding poles, at which neutral positions no net output signal appears across the output winding terminals. Deflection of the shorted rotor in either angular direction from the neutral positions results in an output of electrical signals which, in phase, characterize the sense of angular deflection and which, in amplitude, proportionately characterize the extent of angular deflection over a moderate range from a sharply defined null at the neutral positions.

Although the features of this invention which are believed to be novel are set forth in the appended claims, the details of the invention itself and further objects and advantages thereof may be most readily comprehended through reference to the following description taken in connection with the accompanying drawings, wherein:

Fig. 1 is a pictorial representation of one embodiment of a pick-off or sensitive torque motor embracing the concepts of this invention and having a hollow shorted turn rotor;

Fig. 2 presents a sectionalized side view of electromagnetic apparatus having a solid conducting rotor;

Figure 1:
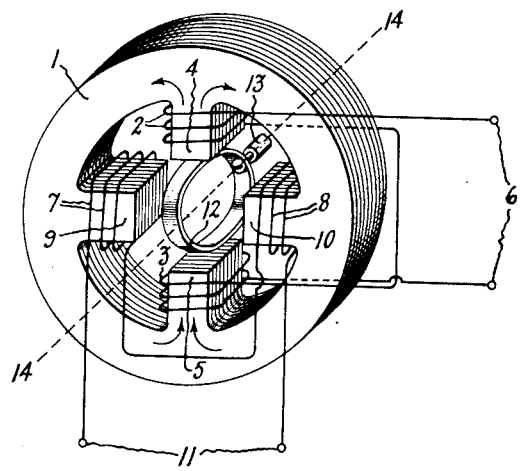

One arrangement for practicing this invention is illustrated in Fig. 1 of the drawings as comprising a generally annular stack of magnetically permeable stator laminations 1, having four inwardly directed poles angularly spaced about equally from one another. Serially coupled excitation windings 2 and 3 surround the excitation poles 4 and 5, respectively, and are energized from a source of periodically varying voltage, represented by supply terminals 6, such that their magnetic fluxes are additive and flow across the gap between the faces of poles 4 and 5. Serially coupled output windings 7 and 8 surround the output poles 9 and 10, respectively, such that voltages may be induced therein for delivery to an appropriate signal-utilizing device by way of the output terminals 11. The rotor element 12 comprises a shorted conductor of substantially annular configuration, symmetrically supported by an angularly movable rotor shaft 13 about a central axis 14—14.

In the absence of the conducting rotor, and with the exciting windings 2 and 3 fully energized, all of the alternating magnetic flux will flow through the excitation poles 4 and 5, and most of that flux will travel directly from one of poles 4 and 5 to the other straight across the air gap separating these poles. Most of the magnetic flux will complete closed magnetic circuits through the two halves of the stator core 1, equally proportioned therebetween, and will avoid flowing through the output winding poles 9 and 10 such that no voltages will be induced in output windings 7 and 8. A small amount of the excitation flux will flow through output poles 9 and 10, of course, due to their proximity with the excitation poles 4 and 5. However, where there is complete stator symmetry and the fluxes from excitation poles 4 and 5 are equal, fluxes flowing through pole 9 from excitation poles 4 and 5 will cancel, these fluxes being of equal amplitude and opposite senses at any instant, and the fluxes through pole 10 from poles 4 and 5 will likewise cancel. Even if the excitation fluxes are unequal, the voltages induced thereby in output windings 7 and 8 will cancel. Thus, no net voltages will appear across the series combination of output windings 7 and 8.

When the shorted-turn rotor 12 is added to this apparatus, such that it is in the illustrated position with its turn substantially parallel to the alternating flux passing between poles 4 and 5, there is no net current induced in and circulating about the turn, and the rotor does not disturb the equilibrium and zero-output condition just described. That is, rotor 12 is at a null position in the illustrated orientation in relation to the stator. Small clockwise angular displacements of rotor 12 in relation to the aforementioned null position enable the alternating excitation flux to set up circulating currents in the conducting rotor; this being possible because the excitation flux is not then parallel to the plane of the shorted rotor turn. These induced circulating rotor currents in turn generate fluxes which are substantially normal to the plane of the annular rotor. Under the assumed condition of a slight clockwise displacement of rotor 12, a major portion of the flux generated by rotor 12 is directed through output poles 9 and 10, the return paths comprising the two halves of the stator core. In traversing the output poles, these rotor-generated fluxes induce output signals in the output windings 7 and 8, and these signals are of the same phase and are added by virtue of series coupling therebetween such that their sum appears across the output terminals 11. Over a limited range, increased clockwise displacements of the rotor is attended by an increase in the circulating currents induced in the rotor, heightened flux generation by the rotor, and increased induction of output signals in output windings 7 and 8. Ultimately, an angular position is reached at which the increased flux generated by the rotor is ineffective to induce greater output signals in the output windings, because the rotor directs more of its generated flux away from these output windings and their poles. This condition of maximum output signal is reached intermediate the 0–90 degrees range of rotor movement, and further increased clockwise displacement of the rotor results in decreased signal output until a second null or zero output condition is realized with the rotor turned in the 90 degree position, that is, with the plane of the rotor perpendicular to the flux flowing in the gap between excitation poles 4 and 5. At that 90 degree position, maximum rotor currents flow, but all the rotor flux is directed toward the excitation poles and none links the output windings.

Counterclockwise displacements of rotor 12 from the illustrated null position occasion signal outputs of a similar nature but exactly opposite phase. Phase of signal output thus characterizes the angular senses of rotor-stator displacements, while amplitude of signal output proportionately characterizes the angular extents of these displacements over limited ranges which are highly satisfactory in null-sensitive units of this type.

As was mentioned above, when rotor 12 is displaced 90 degrees from the illustrated position, a null or zero output condition exists because, while maximum circulating currents are induced in the shorted turn, the rotor flux does not link the output windings 7 and 8. Increasing clockwise rotor rotation yields net output signals of a phase opposite to that realized when the angular deflection of the rotor is in a counterclockwise direction from this 90 degree null position. Amplitude of output begins to fall off at the angular rotor deflection at which increased flow of rotor flux through the output poles 9 and 10 is offset by the reduced circulating current induced in the rotor turn by the excitation flux from poles 4 and 5.

Although the rotor-stator torque of the pick-off apparatus herein described is extremely small, and is negligible for most applications, the minute torques remaining may be of practical advantage because they may be made positive or negative, depending upon which null position is selected as the reference position of the apparatus. The alignment of the rotor with the excitation poles, as shown in Figure 1, is the position which the shorted turn naturally seeks through the weak torques which are present. Angular displacements of the rotor 12 from that null are resisted by positive or spring-like torques which feebly tend to return the rotor to the null. In the other neutral position, that wherein the rotor is aligned with the output poles 9 and 10, the torques are balanced until the rotor is slightly displaced, angularly. Thereupon, the net torque on the rotor is negative, weakly urging the rotor away from that neutral position into the illustrated null position. In certain applications, notably those of the pick-off as a sensing element about the precession axis of a single-axis rate gyroscope or about a gyro axis where spiral lead-in wires exert positive torques, the negative torque characteristic may be employed with decided advantage.

It has been found that the rotor of this apparatus may be shifted in position either axially or along a diameter of the stator without influencing the character of the output signals. This advantage does not appear in those units employing a rotor having magnetic materials, and it is of pronounced importance in apparatus wherein there is a resilient support or coupling between the two relatively movable parts upon which the rotor and stator of the pick-off are mounted. For example, relatively rotatable members which are intercoupled by a magnetic suspension or a spring suspension will have lateral shifts in the relation between their axes with variations in loadings, and the instant pick-off may be utilized to characterize only relative angular movement because of the insensitivity to lateral displacements.

An additional advantage of the signal generator here disclosed is that the null signal conditions are not obtained through the series opposition of voltages, as is the case in certain other arrangements. Voltage bucking units do not readily yield a sharp and errorless null, inasmuch as the exact phase opposition of all flux and voltage components can rarely be experienced. This is particularly true when the rotor assembly contains permeable magnetic materials which affect the phases of the fluxes inducing the output voltages. By way of contrast, my pick-off produces a null condition which is relatively free from noise signals, since no rotor flux links the output coils, and the signal-to-noise ratio at other settings is likewise improved.

Advantages experienced with the foregoing assembly in its function as a signal generator are also secured when the assembly is electrically connected to operate as a torque motor. This latter operation is brought about through the extremely simple expedient of coupling the terminals 11 of windings 7 and 8 to a source of periodically-varying voltage, rather than to an output signal utilizing device. The voltage source represented by terminals 11 should be of the same periodicity as the voltage source represented by terminals 6, such that the resulting fluxes may interact to create stator-rotor torques. When the rotor plane is substantially parallel with the flux flowing between either poles 4 and 5 or poles 9 and 10, the rotor 12 then generates a flux, by induction from the flux across the other of the pairs of poles, which interacts with the first flux parallel with the rotor plane to produce a maximum rotor torque. Angular movements of the rotor from this position vary the torque which is exerted. Phasing of the stator fluxes to obtain maximum torques may be accomplished by any conventional devices, and one or both of the applied voltages may be varied to control the amount of torque produced. Further, the sense of the torque may be selected as positive or negative by proper phasing of the voltages applied to the two pairs of windings.

Figure 2:
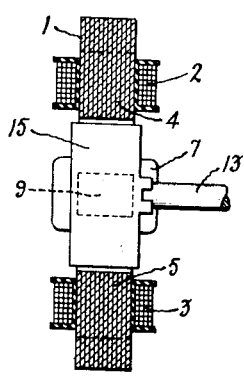

Figure 2 of the drawings depicts a partly cross-sectional side view of a signal generator or torque motor which has a thin solid rectangular bar or plate, 15, as the inductive rotor element. The rotor plate 15 is constructed wholly of conducting material, such as aluminum or copper, and functions in the same manner as rotor 12 in the previously described embodiment. For purposes of clarity and simplicity, those parts of the apparatus in Figure 2 which correspond to those in Figure 1 are designated by the same reference characters. Interconnections of the windings are like those of Figure 1, as well. Tests have demonstrated that the conducting rotor 15 operates effectively without an aperture therethrough to create the physical appearance of a shorted turn. However, as appears later herein, the open or ring-type rotor construction may have certain further constructional advantages.

Figure 3:
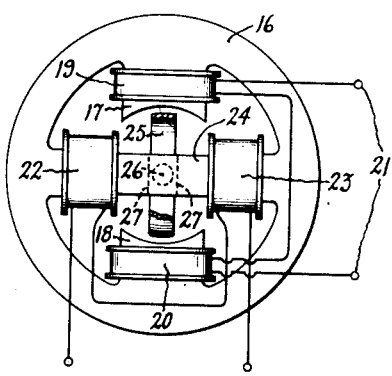
Fig. 3 depicts a front pictorial view of a further embodiment of an electromagnetic device wherein increased output sensitivity may be realized.

It has been found that the sensitivity of a pick-off device as taught by this invention may be increased substantially by accomplishing a decrease in the magnetic reluctance along the axis of the output windings. An embodiment which incorporates features producing this enhanced sensitivity is represented in the front elevation of a pick-off in Figure 3. There, the substantially annular stator core lamination stack 16 is provided with diametrically-opposite and inwardly-directed excitation poles 17 and 18, serially-coupled excitation windings 19 and 20 being mounted on these poles, respectively, and energized by periodically-varying input signals impressed across input terminals 21. Output windings 22 and 23 are spaced apart along the core leg 24 which extends across the stator core 16 substantially perpendicular to the excitation poles 17 and 18 and provides a low reluctance flux path between these poles and the outer rim of the annular core. Without a conducting rotor in place, the paths and actions of cancelling magnetic fluxes through the output windings 22 and 23 are substantially as has been described in connection with the apparatus of Figure 1. A conducting ring 25 serves as the shorted-turn rotor, being supported for angular movement by a shaft 26 and encompassing the core leg 24. The circulating currents in rotor 25 are of greater intensity because of the lowered reluctance to the flow of rotor flux which results from the presence of core 24 within the shorted turn, and core 24 also permits more rotor flux to intercept the output windings. These effects combine to yield higher output signals from the pick-off, the mode of operation otherwise being essentially that set forth for the preceding embodiments. Both output windings may be combined into a single winding extending the full length of the core leg 24, with equivalent results. For convenience of assembly, the core leg 24 may be broken, as represented by dashed lines 27, to facilitate positioning of the rotor 25 in its proper place. Either one of the two output windings 22 and 23, or the single full-length output winding which may be used instead, may be moved along the core leg 24 to balance the null output from the pick-off.

Figure 4:
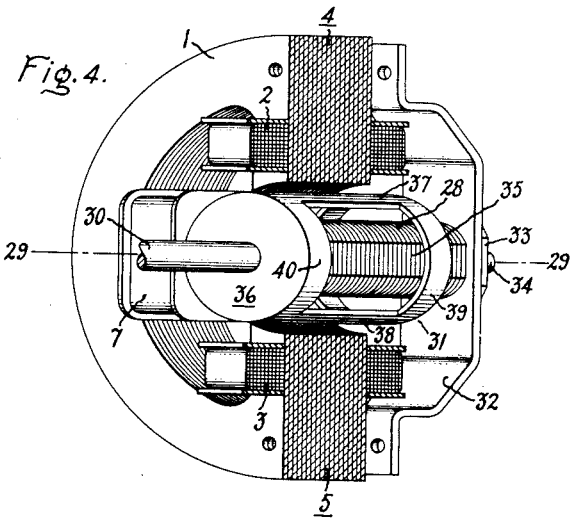
Fig. 4 shows a preferred electromagnetic structure including a null adjustment member.

Figure 4 illustrates a preferred embodiment of this invention, with provision for adjustably bridging magnetic fluxes to sharpen the output characteristics near null positions. The stator core and windings are identified by the same reference characters as were employed in the discussion of Figures 1 and 2, inasmuch as their construction, relation, and interconnections are alike. Output pole 10 and output winding 8 do not appear in this view because a portion of the unit is sectioned to expose the rotor and flux bridge structures. In this embodiment, a stationary core or bridge 28 is centrally positioned such that it is coaxial with the axis 29—29 of the rotor shaft 30 and the shorted turn rotor 31. A bracket 32 affixed to the stator core 1 supports the bridge along that axis, and a nut 33 cooperates with a bolt 34 attached to the bridge to permit an adjustable locking of the bridge to the bracket in a desired angular relationship about the axis 29—29. Although bridge 28 is a generally cylindrical stack of laminations of permeable magnetic material, one portion, 35, is flattened to introduce a lack of symmetry which is important for the purpose of null adjustments. Without the bridge in position, there may exist certain deformations of the ideal flux patterns which would disturb both the position and magnitude of the small null signal. To reduce the signal to a substantially zero value, the flux bridge 28 is added, preferably such that the flattened portion 35 is symmetrically opposite one of the poles, a condition which results in a symmetrical distribution of flux in the pick-off. The bridge is then angularly oriented about axis 29—29 until the null output signal is a minimum value, the nut 33 thereafter being adjusted to secure the bridge in that position.

The arrangement of the stator and bridge cores in Figure 4 being one which prevents the use of a wholly flat shorter turn rotor, the conducting rotor 31 is constructed with a unique configuration which lends itself to that specific application and, further, introduces structural advantages. As is shown, rotor 31 is hollow and generally cylindrical, with its longitudinal axis coincident with axis 29—29, the closed end 36 being attached to the rotor shaft 30. The opposite end is left open, such that the bridge 28 may project into the interior of the rotor. Flux from the excitation poles 4 and 5 is intercepted by the two parallel rotor conductors 37 and 38 which are 180 degrees apart about the periphery of the rotor and which are formed by removing material from the cylindrical rotor until just these conductors, end 36, and end-rings 39 and 40 remain. Conductors 37 and 38 are preferably of greater length than the axial length, or thickness of the stator poles, the return path for circulating rotor currents being provided by end-rings 39 and 40 and by the rotor end plate 36. This rotor structure functions electrically and magnetically in substantially the manner already described in connection with the rotor 12 of the apparatus of Figure 1, except that the stator bridge 28 enhances the rotor effects and provides a sharpened and noiseless null characteristic for the pick-off. Torque motor operation obtains when all of the pole windings are appropriately excited, as has been explained in connection with the apparatus of Figure 1.

Figure 5:
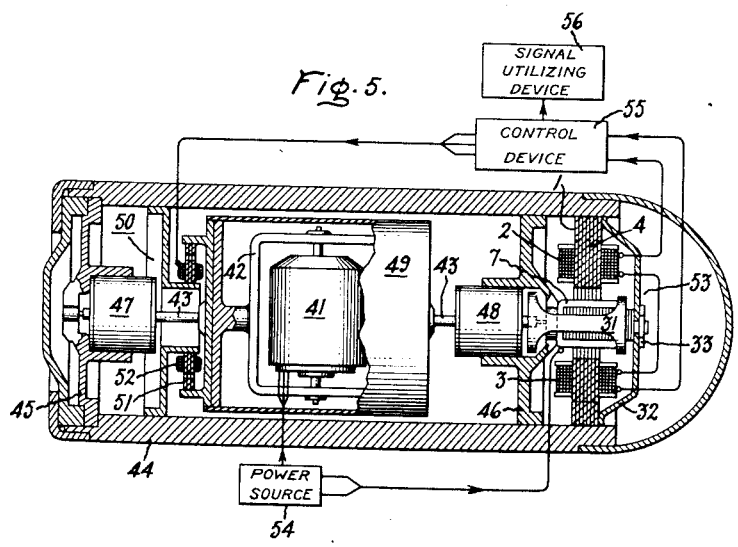
Fig. 5 illustrates an application of the signal generator embodiment of this invention which extensively utilizes the advantages thereof.

In Figure 5, there is presented a sectionalized view of a magnetically-suspended rate gyroscope, incorporating the signal generator of this invention, together with block-diagrammed system circuitry. This arrangement is one wherein the fullest advantages of my invention are realizer, namely, minimized rotor weight, insensitivity to axial and radial displacements, absence of appreciable torques and side thrusts, ease of adjustment, absence of rotor electrical connections, sharpness of null characteristics, and very high signal-to-noise ratios of output characteristics. The rate gyroscope unit includes an electrically-driven gyro rotor 41 journalled in a gimbal 42 for rotation about a spin axis normal to the axis of the gimbal-supporting shaft 43. Outer frame 44, which is affixed to a supporting craft, is provided with two end brackets, 45 and 46, in which the main gyro support shaft is mounted for angular movement. Low-friction bearings are housed in the end brackets to limit axial movement of the shaft 43, and the major radial support of the shaft 43 is provided by magnetic suspension units 47 and 48 which are also housed in these brackets. Gyro rotor 41 and its gimbal 42 are enclosed within a hermetically-sealed container 49. A torque motor 50, having a rotor 51 fixed with the gimbal 42 and a stator 52 affixed to the outer frame 44, exerts torques about the axis of gyro shaft 43 to restore it to neutral position when angular deviations about that axis are detected by the pick-off 53. As is well known in the rate gyro art, any angular movement of the outer frame 44 about an axis normal to both the rotor spin axis and its gimbal support shaft 43 will cause precession about the axis of shaft 43 to an angular extent proportional to the rate of such angular movement. Pick-off 53, which is excited by the alternating current power supply 54, delivers electrical output signals characteristic of this angular deflection to a control device 55 which in turn excites the torque motor 50 until it exerts a torque equal and opposite to the precession torque and also excites a signal-utilizing device 56, such as a rate-of-turn indicator or an autopilot control channel.

Pick-off 53 in this system is of a construction like that depicted in Figure 4, and the parts thereof are designated by corresponding reference numerals. Stator core 1 is affixed to the outer frame 44, and rotor 31 is supported by the gyro supported shaft 43, such that the output signals generated in the pick-off output windings characterize the relative angular deflections of the shaft 43. The extraordinary advantages of this pick-off appear in such an application. By way of illustration, it should be noted that magnetic suspension units, such as units 47 and 48, permit a considerable radial deflection of the shaft 43 as well as a certain axial play which is limited by the low-friction bearings in end brackets 45 and 46. Accordingly, a pick-off which responds to either of these movements is defective in that the output signals will contain errors intolerable in an instrument and system which demand such a high degree of sensitivity and accuracy. However, as has been pointed out earlier herein, the instant pick-off is substantially insensitive to both radial and axial shifts of the rotor shaft within wide limits, and yields output signals characterizing almost solely the angular relationship between the stator and rotor without being influenced by the resiliency of a magnetic or similar suspension. A second major advantage lies in the fact that, when the apparatus is connected as a pick-off, the wholly conductive and non-magnetic rotor structure may permit rotor-stator torques of only the most minute values. In the gyroscope illustrated, restraining torques produced by a pick-off would introduce errors in the system signal output, because the torques impressed about the gyro support axis should comprise only those resulting from precession, and in other types of gyroscopes the torques would effect intolerable precessions. The use of my pick-off with an integrating gyroscope or with a two-axis gyroscope is further of decided benefit in that whatever small torques are developed may be made negative, that is, they may be exerted in senses which are opposite to the conventional spring torques of current lead-in spirals. In Figures 4 and 5, the location of rotor 31 in null alignment with the pick-off or output windings is one which yields this negative torque characteristic when angular displacements occur. Lightness of the pick-off rotor, which results from the use of light non-conducting material rather than heavier permeable magnetic material, and the absence of slip-ring or spiral rotor-energizing leads, are both important in the reduction of bearing friction and loading of the gyro support axis. Known gyroscope systems are no more accurate than the control signal generators used with them unless elaborate compensators are also employed, and the excellent null and signal-to-noise characteristics of this pick-off are thus of major advantage.

Numerous constructions of signal generators may be devised within the purview of the teachings of this invention. By way of illustration, the conducting rotor may comprise a shorted winding comprised of multiple turns of wire, and the configurations may be of any convenient design. Two excitation windings may be employed with but a single output winding, or, conversely, two output windings with a single excitation winding, and the arrangement including a single excitation and a single output winding also suffices to produce the desired results. Flux bridges for accomplishing adjustments of null signals may comprise convenient eccentric or unsymmetrical units of permeable magnetic material adjustably positioned in proximity with the stator poles to enable a compensation of the flow pattern of stator flux in the air gaps.

It should thus be apparent that the specific embodiments of this invention disclosed herein are of a descriptive rather than a limiting nature and that various changes, combinations, substitutions, or modifications, may be employed in accordance with these teachings without departing in spirit or scope from this invention in its broader aspects.

What I claim as new and desire to secure by Letters Patent of the United States is:

1. Electromagnetic apparatus comprising a substantially annular stator core having two pairs of oppositely-disposed inwardly-extending poles, the axes of said pairs of poles being substantially perpendicular, excitation windings mounted on the poles of one of said pairs of poles, a source of periodically-varying electrical signals, means coupling said excitation windings with said source to produce diametric magnetic fluxes which are additive across the gap between the poles of said one pair of poles, a substantially planar rotor member of conductive material, means supporting said rotor member intermediate said poles for angular movement about an axis parallel with the plane of said member and normal to said axes of said poles, whereby currents are induced in said rotor member when said diametric fluxes and the plane of said rotor member are not parallel, and windings mounted on the poles of the other of said pairs of poles for interaction with fluxes produced by said currents induced in said rotor member.

2. Electromagnetic apparatus comprising stator means producing a periodically-varying field of substantially parallel lines of magnetic flux, a conductive rotor having at least a portion thereof which is substantially planar, means supporting said rotor for angular movement about an axis parallel with the plane of said rotor portion and normal to said lines of flux, said rotor being shaped to permit currents induced therein by said flux to circulate in a net angular direction about said rotor portion, and stator winding means disposed to have electrical output signals induced therein by said rotor flux produced by said induced currents.

3. Electromagnetic apparatus comprising stator means producing a first periodically-varying field of substantially parallel lines of magnetic flux, a conductive rotor having at least a portion thereof which is substantially planar, means supporting said rotor for angular movement about an axis parallel with the plane of said rotor portion and normal to said lines of flux, said rotor being shaped to permit currents induced therein by said flux to circulate in a net angular direction about said rotor portion, and winding means producing a second periodically-varying field of substantially parallel lines of flux substantially normal to said first flux field, said winding means being disposed to direct said second flux field for interaction with rotor flux produced by said induced rotor currents.

4. Electromagnetic apparatus comprising a stator core, first winding means on said core for producing a periodically-varying field of substantially parallel lines of magnetic flux, a source of periodically-varying electrical signals energizing said winding means, a conductive rotor having at least a portion thereof which is substantially planar, means supporting said rotor for angular movement about an axis parallel with the plane of said rotor portion and normal to said lines of flux, said rotor being shaped to permit currents induced therein by said flux to circulate in a net angular direction about said rotor portion and generate a flux substantially normal to said rotor portion, and second winding means on said core disposed to interact with said generated rotor flux.

5. Electromagnetic apparatus comprising a stator core, first winding means on said core for producing a periodically-varying field of substantially parallel lines of magnetic flux, a source of periodically-varying electrical signals energizing said winding means, a short-circuited conductive rotor having at least a portion thereof which is substantially planar, means supporting said rotor for angular movement about an axis parallel with the plane of said rotor portion and normal to said lines of flux, said rotor being shaped to provide paths for currents induced therein by said flux to flow in a net angular direction about said rotor portion and to generate a flux substantially normal to said rotor portion, and second winding means on said core disposed to interact with said generated rotor flux.

6. Electromagnetic apparatus comprising stator core means having two pairs of oppositely-disposed stator poles, stator excitation winding means for producing a flow of periodically-varying flux between the poles of one of said pairs of poles, a source of periodically-varying electrical signals, energizing said winding means, a short-circuited conductive rotor having at least a portion thereof which is substantially planar, means supporting said rotor for angular movement about an axis parallel with the plane of said rotor portion and normal to the axis of said one pair of poles, whereby currents are induced in said rotor when said flux and said planar portion of said rotor are not parallel, and stator output winding means having output electrical signals induced therein by flux produced by circulating currents in said rotor portion and directed through the other of said pairs of stator poles.

7. Electromagnetic apparatus comprising a symmetrical stator core having two pairs of oppositely-disposed inwardly-extending poles, the axes of said pair of poles being substantially perpendicular, excitation winding means on said stator core producing periodically-varying magnetic flux across the gap between the poles of one of said pairs of poles, a substantially planar closed-loop rotor of electrically conductive material, means supporting said rotor intermediate said poles of said one pair of poles for angular movement about an axis parallel with the plane of said member and normal to said pole axes, whereby currents are induced in said rotor by said flux and generate a rotor flux substantially normal to said planar rotor, and electrical output windings mounted on said core to have output signals induced therein only by said generated rotor flux which is directed through the other of said pairs of poles.

8. Electromagnetic apparatus comprising a symmetrical stator core of permeable magnetic material having two pairs of inwardly-extending oppositely-disposed poles, the axes of said pair of poles being perpendicular, excitation windings on the poles of one of said pairs of poles, a source of periodically-varying electrical signals, means coupling said excitation windings with said source to produce excitation magnetic fluxes which are additive and substantially parallel across the gap between said poles of said one pair of poles, a flattened shorted conductive rotor, means supporting said rotor for angular movement in said gap about an axis parallel with the plane of said rotor and normal to said axes of said poles, whereby circulating currents are induced in said rotor and generate flux substantially normal to said plane of said rotor, electrical output windings mounted on the poles of the other of said pairs of poles to have output signals induced therein by said generated rotor flux directed through said other of said pairs of poles, and permeable flux bridging means adjustable in relation to said stator core for bridging excitation flux from said one pair of poles through said other pair of poles to cancel net excitation fluxes through said other pair of poles.

9. Electromagnetic apparatus as set forth in claim 8 wherein said flux bridging means comprises a member of permeable magnetic material supported with said stator and disposed within said gap between said poles, said member being adjustable about said rotor axis to produce different asymmetrical relationships between said member and said poles, and wherein said conductive rotor comprises a pair of parallel conductors joined at one end with a transverse disk portion and at the other end with a transverse open ring portion, said rotor and flux bridging member being positioned in a non-contacting nested relationship about said rotor axis.

References Cited in the file of this patent

UNITED STATES PATENTS

| | | |
|---|---|---|
| 1,869,125 | West | July 26, 1932 |
| 1,897,415 | Barbour | Feb. 14, 1933 |
| 2,352,458 | Thompson | June 27, 1944 |